United States Patent [19]

Hanaki et al.

[11] Patent Number: 5,060,544

[45] Date of Patent: Oct. 29, 1991

[54] METHOD OF AN APPARATUS FOR RETRACTING TOOL IN NUMBERICAL CONTROL MACHINE TOOL

[75] Inventors: Yoshimaro Hanaki; Kyoichi Yamamoto, both of Ooguchi, Japan

[73] Assignee: Kabushiki Kaisha Okuma Tekkosho, Aichi, Japan

[21] Appl. No.: 500,253

[22] Filed: Mar. 27, 1990

[30] Foreign Application Priority Data

Mar. 27, 1989 [JP] Japan .................................. 1-74722

[51] Int. Cl.⁵ .............................................. B23B 3/00
[52] U.S. Cl. ...................................... 82/1.11; 82/137
[58] Field of Search ................. 82/1.11, 134, 137, 152

[56] References Cited

U.S. PATENT DOCUMENTS 4,085,890 4/1978 Kimura et al. ...................... 364/561
4,513,646 4/1985 McMurtry ............................ 82/1.11

Primary Examiner—James G. Smith
Assistant Examiner—Lawrence Cruz
Attorney, Agent, or Firm—Wenderoth, Lind & Ponack

[57] ABSTRACT

A tool retracting method and apparatus is for retracting a tool in an NC machine tool upon the detection of the occurrence of an abnormal machining condition during operation of the NC machine tool. The tool retraction direction is determined which is counter to the direction of the cutting load acting on the work at the moment of the occurrence of the machining abnormality, so that the tool can be promptly retracted without interfering with the work.

7 Claims, 6 Drawing Sheets

METHOD OF AN APPARATUS FOR RETRACTING TOOL IN NUMBERICAL CONTROL MACHINE TOOL

BACKGROUND OF THE INVENTION

The present invention generally relates to a numerical control machine tool apparatus and, more particularly, to a method of and an apparatus for retracting a tool of such a machine tool apparatus when an abnormal condition in the automatic machining operation of the machine tool is detected.

Various methods have been proposed for retracting a numerical control (referred to as "NC" hereinafter) machine tool. Such methods include a method in which the tool is manually retracted, a method in which the tool is automatically retracted in a predetermined direction, a method in which the tool is automatically retracted in a direction which is determined by the path of the tool from the start till the end of the machining stored in a memory, and a method in which the tool is automatically retracted in accordance with instructions concerning the direction of machining such as end-surface cutting, turning or the like.

FIG. 1 is a block diagram of a tool retracting apparatus which carries out the above-mentioned method for automatically retracting a tool in a predetermined direction. Any abnormal conditions occuring during automatic machining is detected by a machining abnormality detecting section 1, which then delivers a machining abnormality signal SA to a retraction operation controlling section 2. The retraction operation controlling section 2 reads a retraction parameter SB stored beforehand in a retraction parameter registering section 3 and also reads a tool moving direction SC at the moment of occurrence of the abnormal condition from an NC apparatus 4. The retraction operation controlling section 2 then produces a tool retraction command SD in accordance with the read data. This tool retraction command SD is input to the NC apparatus 4 so that the latter reads, from an output from a position detector 5, the current position SE representing the position of the tool at the moment of occurrence of the abnormal conditions, thereby effecting retraction of the tool.

This operation will be described with reference to the flow chart shown in FIG. 2. In Steps S1 and S2, the machining abnormality detecting section 1 monitors the state of machining, i.e., whether any abnormal condition has taking place, after the start of the maching. When the machining is completed without the occurence of an abnormal conditions, the entire routine is ceased. However, when the machining abnormality detecting section 1 detects the occurence of an abnormal conditions in the Step S2, it delivers the machining abnormality signal to the retraction operation controlling section 2. Upon receipt of this signal, the retraction operation controlling section 2 reads, in accordance with the received signal, a tool retraction relative position ($\Delta X$, $\Delta Z$) and retraction path as retraction parameters from the retraction parameter registering section 3. At the same time, the retraction operation controlling section 2 reads the direction of movement of the tool at the moment of occurrence of the abnormal conditions from the memory of the NC apparatus 4, and generates and delivers a tool retraction command to the NC apparatus 4. These operations are conducted in Step S3. In Step S4, the NC apparatus 4 reads the position (X, Z) of the tool at the moment of occurrence of abnormality from the output of the position detector 5 and effects the retraction of the tool in accordance with the current position (X, Z) of the tool and the tool retraction command given by the retraction operation controlling section 2.

For instance, when the tool retraction command is given such as to retract the tool from a position A to a position C via a position C, the tool retracting operation is conducted in two steps ① and ② as follows:

① $A(X, Z) \rightarrow B(X - pX_f, Z - pZ_f)$
② $B(X - pX_f, Z - pZ_f) \rightarrow C (X + \Delta X, Z + \Delta Z)$ where, p is a value greater than 0, while ($X_f$, $Z_f$) represents the vector of movement of the tool.

After the tool has been retracted, a suitable countermeasure, such as replacement of the tool, is conducted by a manual operation or an interrupting program and then the machining program is restarted in the Step S5 and the process returns to the Step S1 to repeat the described operation.

The manual tool retracting method mentioned above relies upon a manual labor of the operator for retracting the tool. This method, therefore, cannot enable the machine tool to recover promptly, and has a high risk of interference between the tool and the work. In another known method in which the tool is automatically retracted in a predetermined direction, if the retracting direction is given as from the position A to the position B and then to the position C as shown in FIG. 3, there is a risk that the tool will interfere with the work during retraction from the position B to the position C when the tool has been used for machining out an end surface of the work as shown in FIG. 4. This method, therefore, cannot be adopted when the machining program includes both the turning and the end surface machining of the tool. The known method in which the tool retracting direction is determined from the path of the tool is impractical in that a storage means of a large capacity is required to store the tool path from the beginning to the end of the machining, with the result being that the cost of the apparatus is raised. Finally, the method in which the tool is automatically retracted in a retracting direction determined on the bass of the machining direction designated in the machining program requires troublesome efforts of modifying the machining program and tends to cause problems due to misprogramming.

SUMMARY OF THE INVENTION

Accordingly, an object of the present invention is to provide a tool retracting method and apparatus for use in an NC machine tool which is capable of automatically retracting a tool in accordance with tool retracting commands and obviating the above-described problems of the prior art.

According to one aspect of the present invention, there is provided a method of retracting a tool in an NC machine tool upon detection of an abnormal condition during automatic machining of a work by the NC machine tool which includes the steps of: detecting, upon the detection of the abnormal condition, the vector components of the magnitude of the machining load in at least two axes directions; determining the direction of the machining load acting on the work from the ratio of the machining load magnitude vector components; determining the tool retraction relative position in accordance with the direction of the machining load; generating a tool retraction command in accordance with the tool retraction relative position; and causing the tool to be automatically retracted in accordance with the tool retraction command.

According to another aspect of the present invention, there is provided a tool retracting apparatus which, upon detection of an abnormal condition during automatic machining performed by an NC machine tool, automatically generates a retraction command to retract a tool in accordance with the retraction command. The apparatus includes: means for detecting the components of the vector magnitude of the machining load in at least two axes the directions when the abnormal condition is detected; means for determining the direction of the machining load acting on the work from the ratio of the machining load magnitude components; means for determining the tool retraction relative position in accordance with the direction of the machining load; and means for generating a tool retraction command in accordance with the tool reraction relative position.

The above and other objects, features and advantages of the invention will become more clear from the following description of the preferred embodiments when the same is read in conjunction with the accompanying drawings.

DESCRIPTION OF THE PREFERRED EMBODIMENTS

Figure 1:
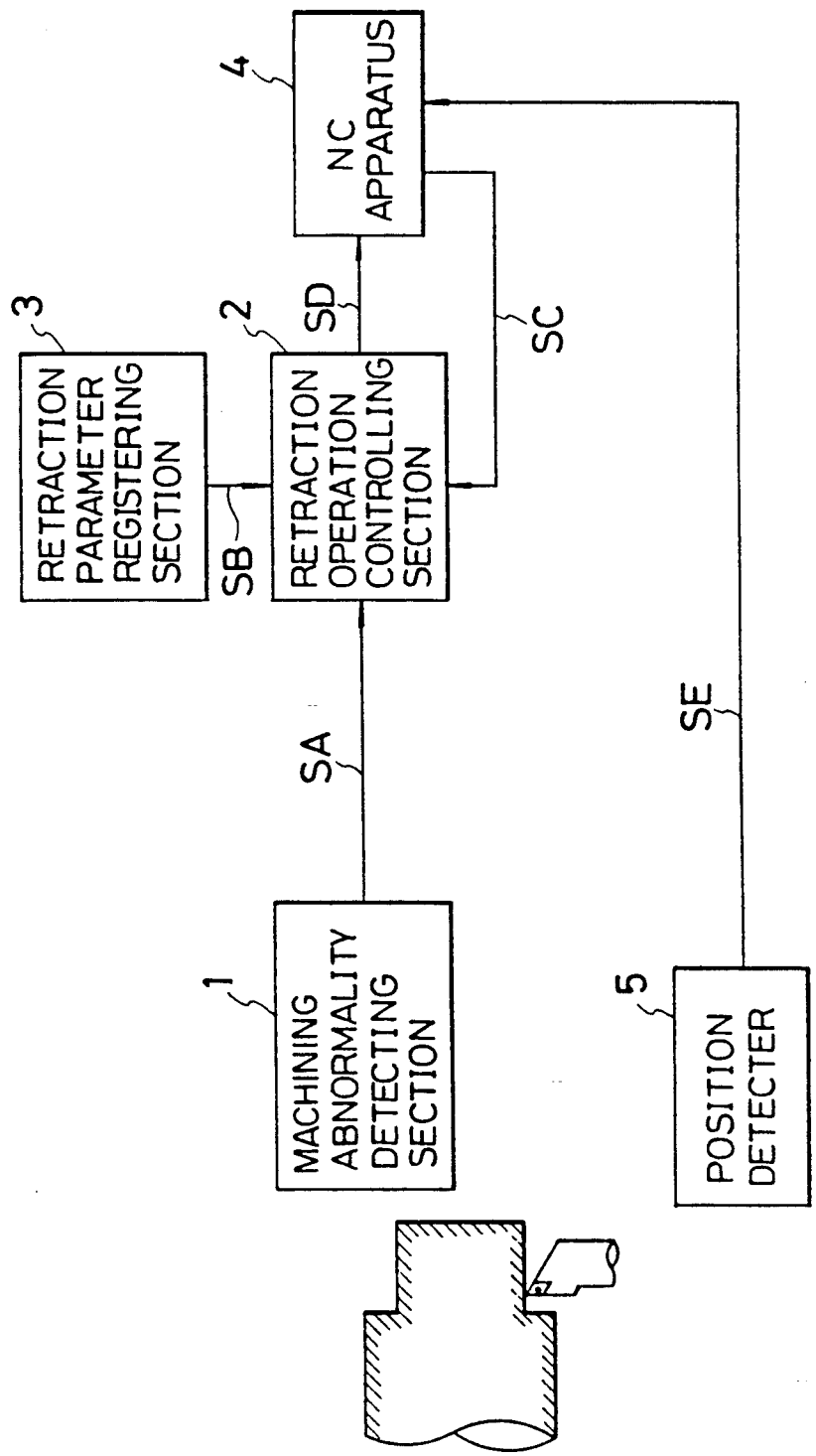
FIG. 1 is a block diagram of a known tool retracting apparatus used in an NC machine tool.
Figure 2:
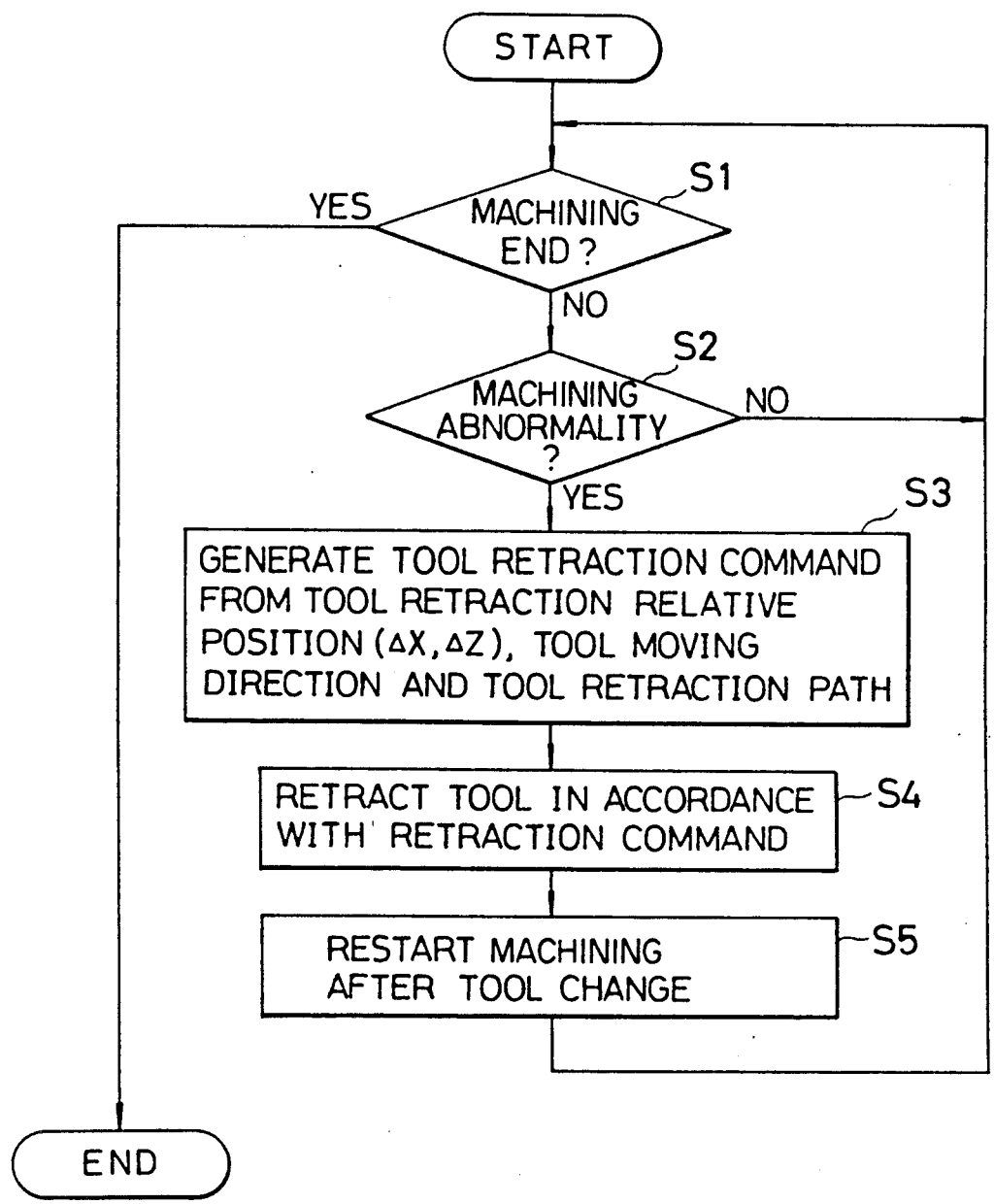
FIG. 2 is a flow chart illustrative of the operation of the known apparatus shown in FIG. 1.
Figure 3:
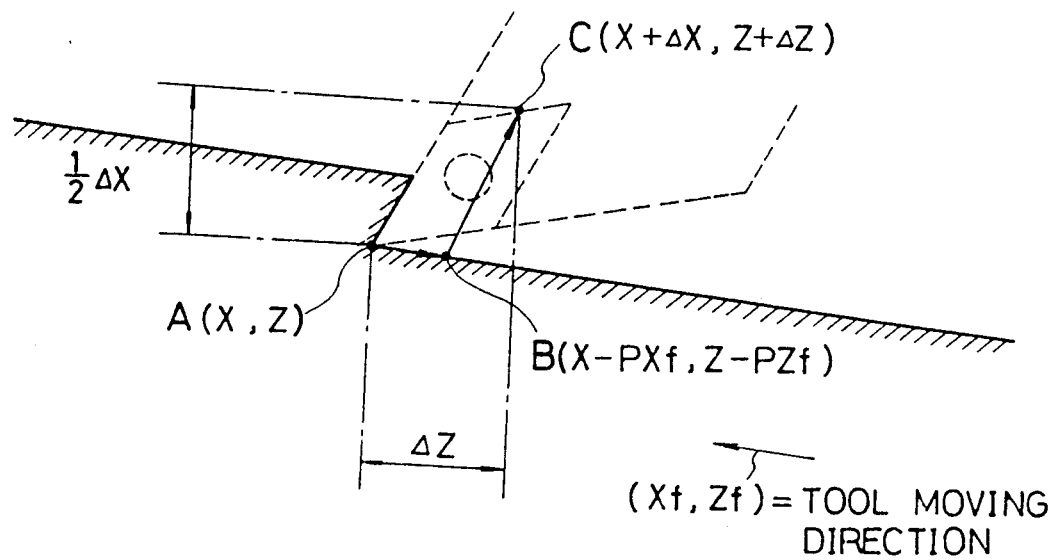
FIGS. 3 and 4 are illustrations of conventional tool retracting methods for the NC machine tools.
Figure 4:
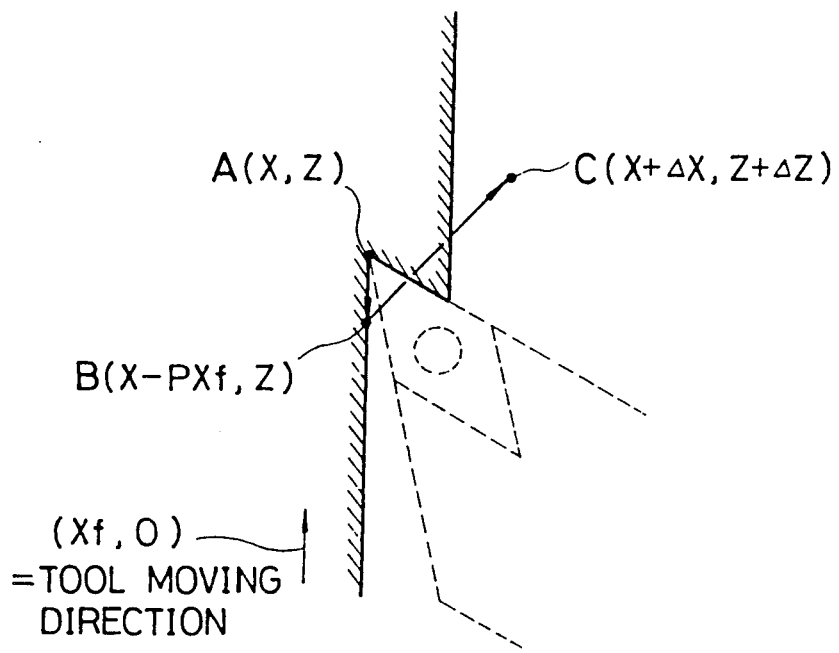
Figure 5:
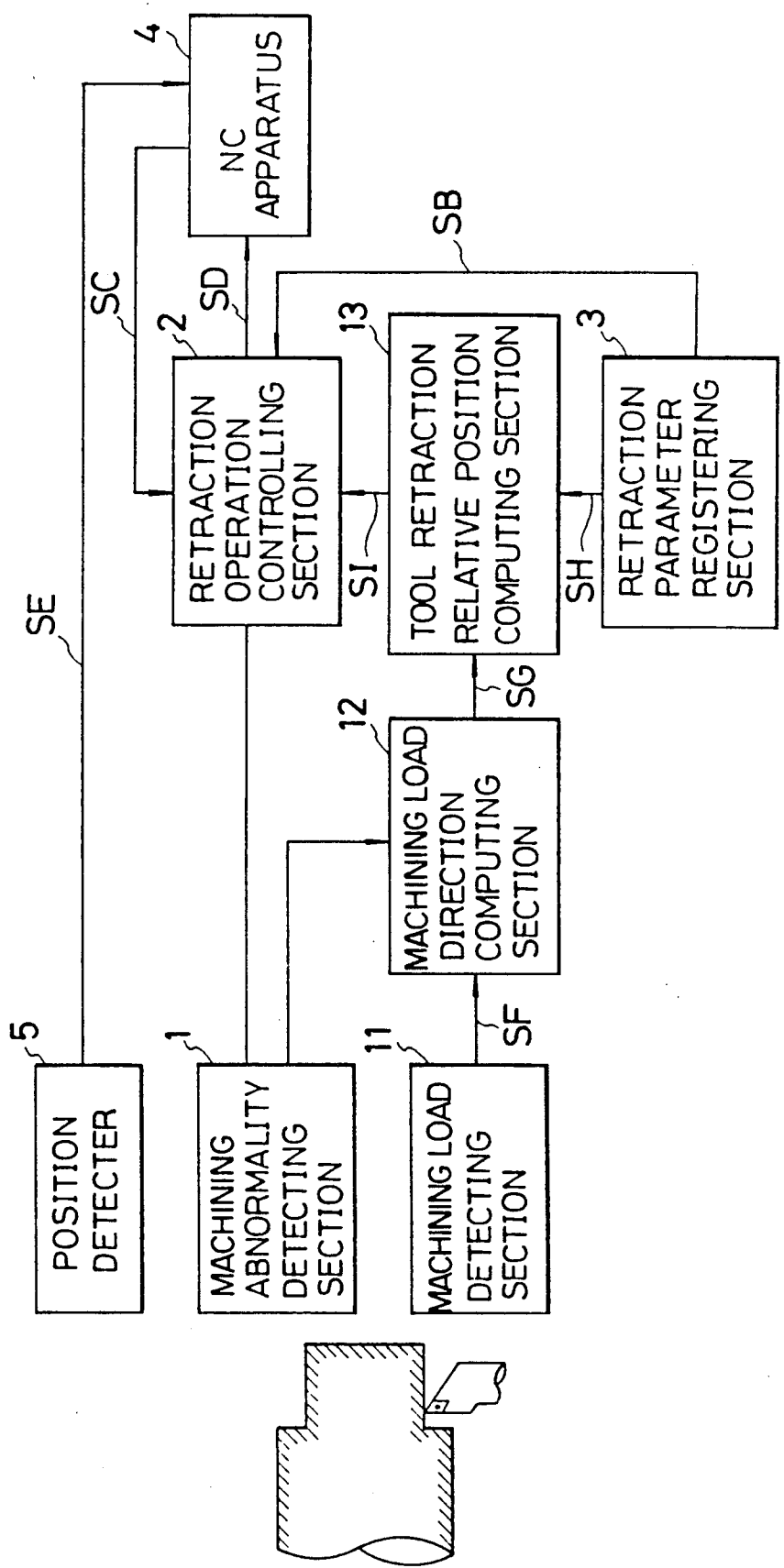
FIG. 5 is a block diagram of an embodiment of the tool retracting apparatus of the invention used in the NC machine tool.

FIG. 5 is a block diagram showing an embodiment of the tool retracting apparatus of the present invention for use in an NC machine tool. In FIG. 5, the same reference numerals are used to denote like components as those shown in FIG. 1 and a detailed description of such like components is omitted.

Briefly, this embodiment is constructed such that, the machining abnormality signal SA produced by the machining abnormality detecting section 1 is delivered to a machining load direction computing section 12, and the machining load SF on the tool at the moment of the detection of the abnormal condition is detected by a machining load detecting section 11. The machining load direction computing section 12 then computes, in accordance with the machining load SF detected by the machining load detecting section 11, a machining load direction vector SG. This cutting load direction vector SG is input to a tool retraction relative position computing section 13 which reads the retraction parameter SH from the retraction parameter registering section 3 and computes a tool retraction relative position SI which is then read by the retraction operation controlling section 2.

Figure 6:
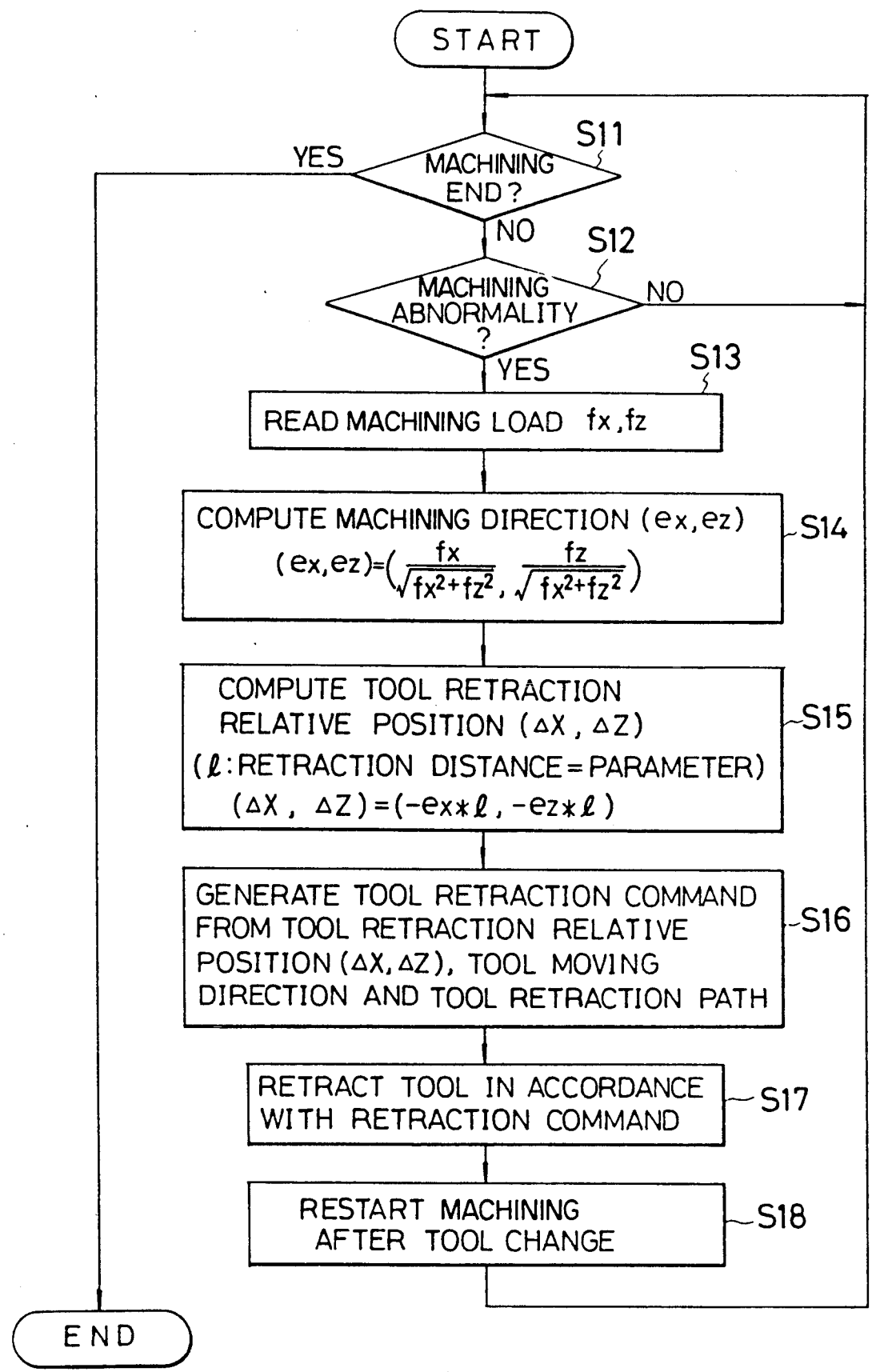
FIG. 6 is a flow chart illustrative of the operation of the embodiment shown in FIG. 5.

The operation of this system will be described with reference to a flow chart shown in FIG. 6. When the machining is commenced, the machining abnormality detecting section 1 monitors the operation to determine whether or not an abnormal has taken place in the Steps S11 and S12. When the machining is completed without any detected abnormality, the entire routine is ceased. However, when the occurrence of an abnormal condition is detected by the machining abnormality detecting section 1 in the Step S12, a machining abnormality signal is input both to the retraction operation controlling section 2 and to the machining load direction computing section 12. In the Step S13, the machining load direction computing section 12 reads the machining load $f_x$, $f_y$ at the moment of the detection of the abnormal condition from the output of the machining load detecting section 11. In the Step S14, the machining load direction computing section 12 computes the machining direction vector ($e_x$, $e_z$) by introducing the machining load $f_x$, $f_y$ into the following formula (1) and inputs the machining load direction vector ($e_x$, $e_z$) to the tool retraction relative position computing section 13.

$$(e_x, e_z) = \left( \frac{f_x}{\sqrt{f_x^2 + f_z^2}}, \frac{f_z}{\sqrt{f_x^2 + f_z^2}} \right) \quad (1)$$

The tool retraction relative position computing section 13 substitutes the load direction vector ($e_x$, $e_z$), as well as a retraction distance l which is a retraction parameter read from the retraction parameter registering section 3, into the following formula (2) so as to determine the tool retraction relative position ($\Delta X$, $\Delta Z$) in Step S15.

$$(\Delta X, \Delta Z) = (-e_x \times l, -e_z \times l) \quad (2)$$

In accordance with the machining abnormality signal derived from the machining abnormality detecting section 1, the retraction operation controlling section 2 reads the tool retraction relative position ($\Delta X$, $\Delta Z$) from the tool retraction relative position computing section 13, the retraction path as the retraction parameter from the retraction parameter registering section 3, and the tool moving direction at the moment of the detection of the abnormality from the NC apparatus 4. Using these data, the retraction operation controlling section 2 generates and delivers a retraction command to the NC apparatus 4 in Step S16. Then, in Step S17, the NC apparatus 4 reads the position (X, Z) of the tool at the moment of the detection of the abnormality from the position detector 5, and performs the tool retracting operation in accordance with the current position (X, Z) of the tool and the tool retraction command given by the retraction operation controlling section 2.

For instance, when the retracting command is for retracting the tool from the position A to the position C shown in FIG. 7, the tool retracting operation (1) is expressed as follows.

① A (X, Z)→C (X+ΔX, Z+ΔZ)

Figure 7:
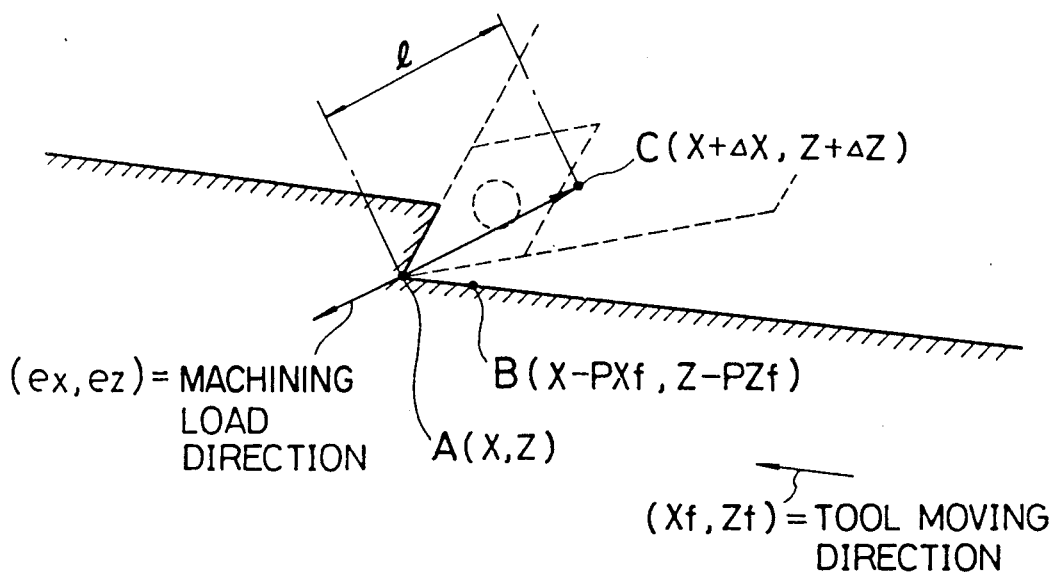
FIGS. 7 and 8 are illustrations of a tool retracting method of the present invention for use in the NC machine tool.

The tool retraction command may be formed so as to retract the tool from the position A to the position C via the position B shown in FIG. 7.

After the extraction of the tool, necessary measures such as the of the tool, are carried out manually or by a suitable interrupting program, and then the machining program is restarted from the block at which the program has been interrupted. Then, the process returns to the Step S1 to conduct the above-described operation repeatedly.

Figure 8:
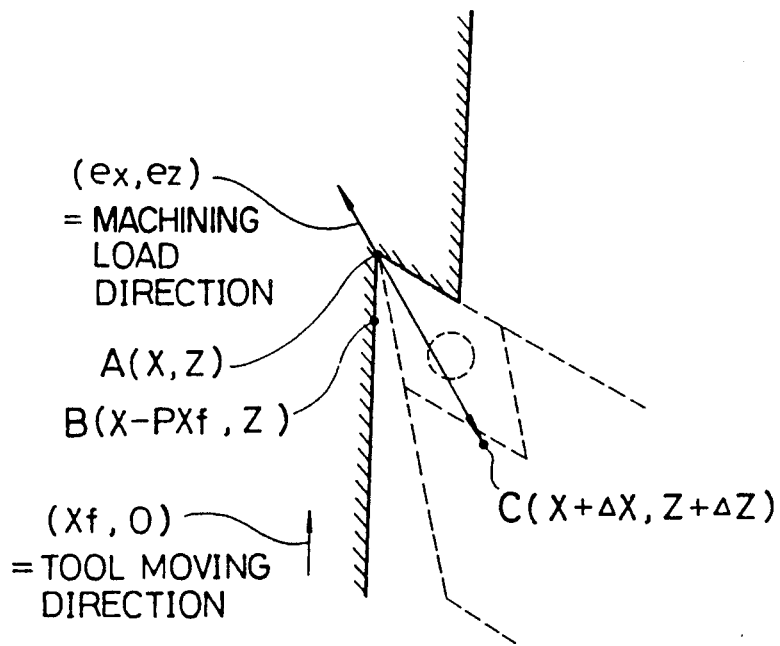

The embodiment described hereinbefore is based on an assumption that the machining operation is a turning for machining the outer peripheral surface of a work. In case of machining of the end surface of the work, the retraction is conducted in a manner as shown in FIG. 8 so that there is no risk of the tool interfering with the work.

The invention is also applicable to three-dimensional machining such as that performed by a machining center. In such an application, the cutting load is detected in three directions X, Y and Z and the vector representing the retracting direction is determined as a three-dimensional vector.

As has been described, the present invention provides a method of and apparatus for retracting a tool in an NC machine tool which, in case there is a machining abnormality, automatically generates an optimum retraction path and retracts the tool along this optimum retraction path. It is thus possible to provide an inexpensive and highly sage tool retraction apparatus while improving the machining efficiency of the NC machine tool.

It should be understood that many modifications and adaptations of the invention will become apparent to those skilled in the art and that the invention is intended to encompass such obvious modifications and changes in the scope of the claims appended hereto.

What is claimed is:

1. A method of retracting a tool of an NC machine tool device upon detection of an abnormal condition during automatic machining of a workpiece by the NC machine tool device, said method comprising the steps of:
   detecting, in response to the detection of the abnormal condition, vector components of a machining load magnitude acting on the workpiece by the tool in each of at least two axis directions;
   determining a direction of the machining load acting on the workpiece based on a ratio of the vector components of the machining load magnitude;
   determining a tool retraction relative position in accordance with the direction of the machining load;
   generating a tool retraction command in accordance with tool retraction relative position; and
   causing the tool to be automatically retracted in accordance with the tool retraction command.

2. A tool retracting method according to claim 1, further comprising the steps of determining whether the automatic machining of the workpiece has been completed, and ceasing said retracting method upon determining that the automatic machining of the workpiece is complete.

3. A tool retracting method according to claim 1, wherein wherein the at least two axes are an X axis and a Z axis, and wherein the vector components are denoted $f_x$, $f_z$ and wherein the direction of the machining load is denoted as a vector ($e_x$, $e_z$) and is computed in accordance with the following formula:

$$(e_x, e_z) = \left( \frac{f_x}{\sqrt{f_x^2 + f_z^2}}, \frac{f_z}{\sqrt{f_x^2 + f_z^2}} \right).$$

4. A tool retraction method according to claim 3, wherein the tool retraction relative position is denoted ($\Delta X$, $\Delta Z$) and is determined by the following formula in which l denotes a distance in which the tool is retracted:

$$(\Delta X, \Delta Z) = (-e_x \times l, -e_z \times l).$$

5. A tool retracting method according to claim 1, further comprising interrupting the machining of the workpiece after the retraction of the tool to correct the abnormal condition and then restarting the machining of the workpiece.

6. A tool retracting method according to claim 1, wherein the machining load direction is determined as a vector having three vector components along three axis directions.

7. A tool retracting apparatus for, upon detection of an abnormal condition during automatic machining of a workpiece by an NC machine tool, automatically generating a retraction command to retract a tool in according with the retraction command, said apparatus comprising:
   means for detecting vector components of machining load magnitude acting on the workpiece in at least two axis directions in response to the detection of the abnormal condition;
   means for determining a direction of the machining load acting on the workpiece based on a ratio of the vector components of the machining load magnitude;
   means for determining a tool retraction relative position in accordance with the direction of the machining load; and
   means for generating a tool retraction command in accordance with the tool retraction relative position.

* * * * *